United States Patent
Kameta et al.

(10) Patent No.: US 10,962,952 B2
(45) Date of Patent: Mar. 30, 2021

(54) SERVO CONTROL APPARATUS THAT PERFORMS LEARNING CONTROL BY CHANGING REFERENCE AXIS

(71) Applicant: FANUC CORPORATION, Yamanashi (JP)

(72) Inventors: Kouki Kameta, Yamanashi (JP); Naoto Sonoda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 63 days.

(21) Appl. No.: 15/076,993

(22) Filed: Mar. 22, 2016

(65) Prior Publication Data

US 2016/0291573 A1 Oct. 6, 2016

(30) Foreign Application Priority Data

Apr. 2, 2015 (JP) ................................. 2015-076301

(51) Int. Cl.
*G05B 19/402* (2006.01)
*G05B 19/19* (2006.01)

(52) U.S. Cl.
CPC ............ *G05B 19/402* (2013.01); *G05B 19/19* (2013.01); *G05B 2219/34013* (2013.01); *G05B 2219/42188* (2013.01); *G05B 2219/50216* (2013.01)

(58) Field of Classification Search
CPC .................. G05B 19/402; G05B 19/19; G05B 2219/34013; G05B 2219/42188; G05B 2219/50216; G05B 19/414
See application file for complete search history.

(56) References Cited

U.S. PATENT DOCUMENTS 6,401,004 B1 * 6/2002 Yamazaki ........ G05B 19/40937 700/159
7,301,297 B2 * 11/2007 Fujibayashi ......... G05B 19/414 318/560

(Continued)

FOREIGN PATENT DOCUMENTS

CN 102027426 A 4/2011
CN 102540965 A 7/2012

(Continued)

OTHER PUBLICATIONS

Untranslated Decision to Grant a Patent mailed by JPO, dated Jul. 26, 2016, 3 pages.

(Continued)

*Primary Examiner* — Thomas C Lee
*Assistant Examiner* — Gary Collins
(74) *Attorney, Agent, or Firm* — Fredrikson & Byron, P.A.

(57) ABSTRACT

A servo control apparatus for a machine that performs machining by causing a plurality of synchronizing axes to operate cooperatively in synchronized relationship with a reference axis, the servo control apparatus comprising: a position detection unit for detecting at least one of the position of the servo motor and the position of a driven body; a position error calculation unit for calculating an error between the position command and the position detected by the position detection unit; a reference axis position acquisition unit for acquiring the positions of a plurality of reference axes; a reference axis selection unit for selecting one reference axis based on a machining condition of the driven body from among the plurality of reference axes whose positions have been acquired; and a learning control unit for performing learning control using an angle (Continued)

synchronization method, based on the error and the position of the selected reference axis.

2 Claims, 8 Drawing Sheets

(56) References Cited

U.S. PATENT DOCUMENTS

| | | | | |
|---|---|---|---|---|
| 7,774,088 | B2* | 8/2010 | Yamada | G05B 19/409 |
| | | | | 700/169 |
| 2005/0168178 | A1* | 8/2005 | Toyozawa | G05B 19/186 |
| | | | | 318/68 |
| 2007/0007926 | A1* | 1/2007 | Iwashita | G05B 19/195 |
| | | | | 318/625 |
| 2012/0022682 | A1* | 1/2012 | Nakamura | G05B 19/182 |
| | | | | 700/186 |
| 2012/0059506 | A1* | 3/2012 | Okita | G05B 13/0265 |
| | | | | 700/173 |
| 2013/0110278 | A1* | 5/2013 | Okita | G05B 19/186 |
| | | | | 700/186 |
| 2013/0134919 | A1* | 5/2013 | Takayama | G05B 19/416 |
| | | | | 318/625 |

FOREIGN PATENT DOCUMENTS

| | | | |
|---|---|---|---|
| EP | 1349027 | B1 | 11/2010 |
| JP | 6309021 | A | 11/1994 |
| JP | 2000222002 | A | 8/2000 |
| JP | 200344102 | A | 2/2003 |
| JP | 4043996 | B2 | 2/2008 |
| JP | 20109529 | A | 1/2010 |
| JP | 2011173234 | A | 9/2011 |
| JP | 201448953 | A | 3/2014 |

OTHER PUBLICATIONS

English machine translation of Decision to Grant a Patent mailed by JPO, dated Jul. 26, 2016, 3 pages.
English Abstract and Machine Translation for Chinese Publication No. 102540965 A, published Jul. 4, 2012, 9 pgs.
English Abstract for Japanese Publication No. 2011-173234 A, published Sep. 8, 2011, 1 pg.
English Abstract for Chinese Publication No. 102027426 A, published Apr. 20, 2011, 1 pg.
English Abstract and Machine Translation for Japanese Publication No. 4043996 B2, published Feb. 6, 2008, 22 pgs.
English Abstract for Japanese Publication No. 2014-048953 A, published Mar. 17, 2014, 1 pg.
English Abstract for Japanese Publication No. 2010-009529 A, published Jan. 14, 2010, 1 pg.
English Abstract for Japanese Publication No. 2003-044102 A, published Feb. 14, 2003, 1 pg.
English Abstract for Japanese Publication No. 2000-222002 A, published Aug. 11, 2000, 1 pg.
English Abstract and Machine Translation for Japanese Publication No. 06-309021 A, published Nov. 4, 1994, 13 pgs.

* cited by examiner

PRIOR ART

SERVO CONTROL APPARATUS THAT PERFORMS LEARNING CONTROL BY CHANGING REFERENCE AXIS

BACKGROUND OF THE INVENTION

1. Field of the Invention

The present invention relates to a servo control apparatus for controlling a servo motor used in a machine such as a machine tool; in particular, in the case where machining is performed with a plurality of synchronizing axes synchronized to a reference axis, this invention relates to a servo control apparatus that performs learning control by changing the reference axis according to a machining condition.

2. Description of the Related Art

Generally, learning control is performed using one of two methods: a time synchronization method and an angle synchronization method. The major difference between the two methods is that, in the time synchronization method, learning control is performed by reference to the cycle (learning cycle) with which the learning control is performed (time reference), while on the other hand, in the angle synchronization method, learning control is performed by reference to the angle of the reference axis (position reference).

In the case of the time synchronization method, since the correction value obtained through learning control is a function of time, the learning cycle changes as the velocity of the reference axis dynamically changes. As a result, the correction value obtained by the previous trial no longer corresponds to the correction value in the current trial, and thus the effect of the learning control cannot be achieved. On the other hand, in the case of the angle synchronization method which performs learning control by reference to the angle, the learning cycle does not change even when the velocity of the reference axis dynamically changes, and thus the effect of the learning control can be achieved.

Accordingly, in applications where the velocity fluctuates, the angle synchronization method is advantageous (for example, refer to Japanese Patent No. 4043996).

One example of a machining method using the angle synchronization method is illustrated in FIGS. 1A and 1B. As illustrated in the perspective view of FIG. 1A, a workpiece 1002 rotates about a rotation axis 1001, and a portion 1003 of the workpiece is machined using a tool 1004. The servo axis (the rotation axis 1001 in FIG. 1A) that serves as a reference is called the "reference axis". In FIG. 1A, machining is performed with a plurality of servo axes (also called the "synchronizing axes", more specifically the X and Y axes in FIGS. 1A and 1B) synchronized to the reference axis. FIG. 1B is a plan view; as illustrated, when the workpiece 1002 rotates in the direction of arrow around the rotation axis 1001, the portion 1003 of the workpiece moves to the position indicated at 1003', and at the same time, the tool 1004 moves to the position indicated at 1004'.

For example, in a machine that grinds a cylindrically shaped eccentric workpiece 1002 such as shown in FIG. 2, machining is performed by a rocking axis 1006 that moves the tool 1004, such as a grinder mounted on a table 1009, in synchronized fashion to the rotation axis 1001 of a servo motor 1005 that rotates the workpiece 1002. When learning control using the angle synchronization method is applied to this machine, learning control is performed with the rocking axis 1006 by reference to the rotation angle of the rotation axis 1001.

In recent years, in order to improve the productivity of a machine tool, a method has come to be employed that uses two rotation axes as shown in FIG. 3 and that performs machining using one of the axes while, at the same time, performing work setup such as attaching or removing a workpiece using the other axis. As illustrated in FIG. 3, in the machining step, the workpiece 1002 is rotated around the first rotation axis 1001-1 by means of the servo motor 1005, and in this condition, machining is performed using the tool 1004 mounted on the table 1009 by synchronizing the rocking axis 1006 to the first rotation axis 1001-1.

On the other hand, in the setup step, the workpiece 1002' to be machined subsequently to the workpiece 1002 is attached to the servo motor 1005' that rotates about the second rotation axis 1001-2. In the setup step, the tool 1004' mounted on the table 1009' is not used.

When the machining of the workpiece 1002 is complete, the machining step and the setup step are switched as indicated by an arrow 1008 in order to perform machining on the workpiece 1002'; that is, the workpiece 1002' is rotated around the second rotation axis 1001-2 by means of the servo motor 1005', and in this condition, machining is performed using the tool 1004' by synchronizing the rocking axis 1006 to the second rotation axis 1001-2. In this case, depending on the machining condition indicating whether the workpiece 1002 as the object being machined is in the machining step or in the setup step, a servo control apparatus (not shown) for controlling the servo motor 1005 must be moved as indicated by an arrow 1007. At this time, the reference axis changes from the first rotation axis 1001-1 to the second rotation axis 1001-2.

SUMMARY OF THE INVENTION

The conventional art has had the problem that learning control using the angle synchronization method cannot be applied to such a machine because it is necessary to change the reference axis according to the machining condition of the workpiece.

According to one embodiment of the present invention, there is provided a servo control apparatus for a machine that performs machining by driving and controlling a servo motor based on a position command and by causing a plurality of synchronizing axes to operate cooperatively in synchronized a relationship with a reference axis, the servo control apparatus comprising: a position detection unit for detecting at least one of the position of the servo motor and the position of a driven body; a position error calculation unit for calculating an error between the position command and the position detected by the position detection unit; a reference axis position acquisition unit for acquiring the positions of a plurality of reference axes; a reference axis selection unit for selecting one reference axis based on a machining condition of the driven body from among the plurality of reference axes whose positions have been acquired; and a learning control unit for performing learning control using an angle synchronization method, on the basis of the error and the position of the selected reference axis.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

Servo control apparatus according to the present invention will be described below with reference to the accompanying drawings.

First Embodiment

Figure 1A:
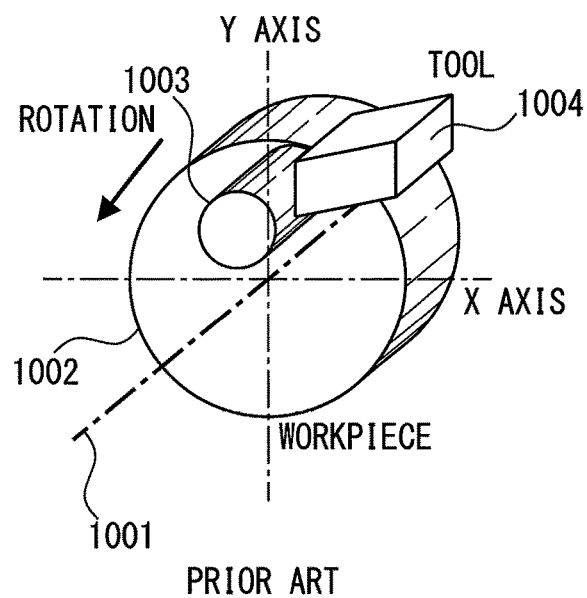
FIG. 1A is a perspective view illustrating a machining method using a conventional art angle synchronization method which performs machining by synchronizing a tool to the rotation axis of a servo motor taken as a reference axis.
Figure 1B:
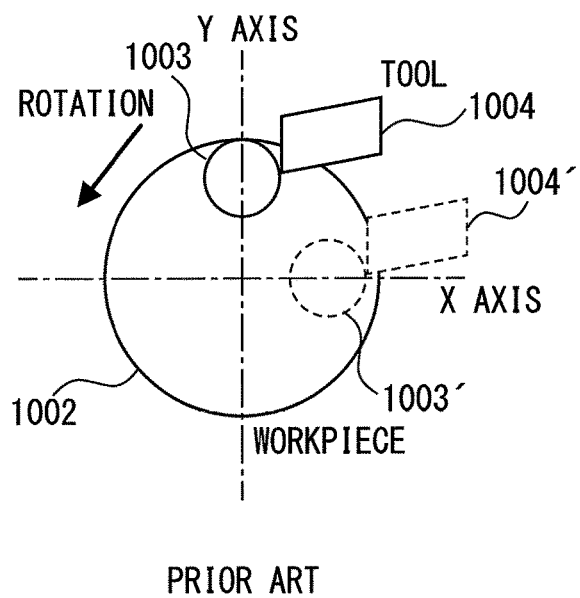
FIG. 1B is a plan view illustrating the machining method using the conventional art angle synchronization method which performs machining by synchronizing the tool to the rotation axis of the servo motor taken as the reference axis.
Figure 2:
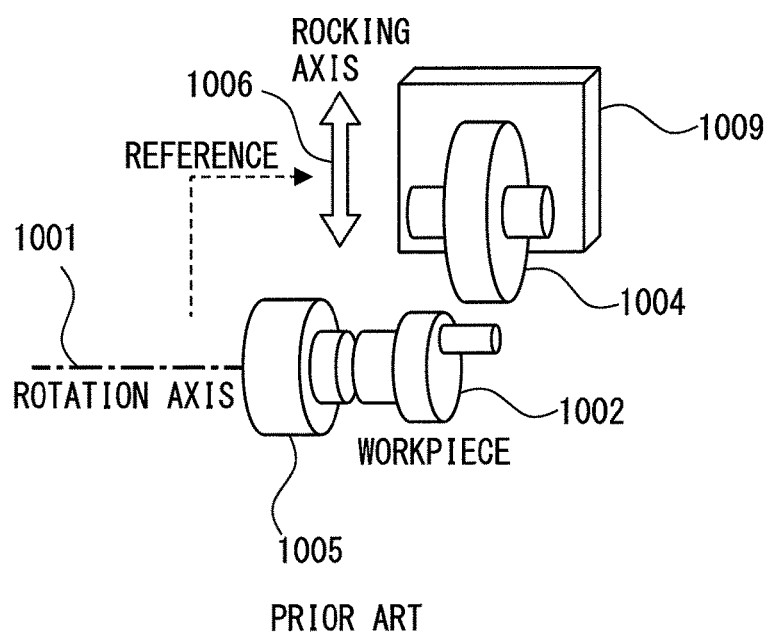
FIG. 2 is a diagram illustrating a conventional art machining method which is employed to grind an eccentric cylindrical workpiece.
Figure 3:
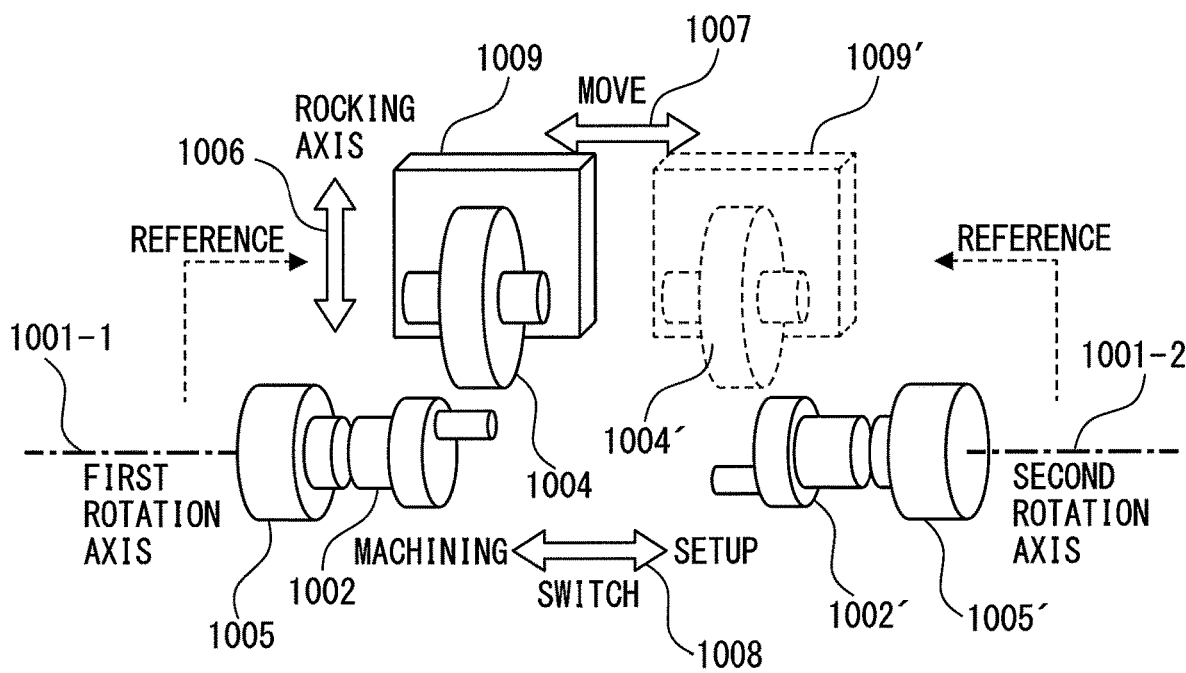
FIG. 3 is a diagram illustrating a conventional art machining method which performs machining by switching between a machining step and a setup step.
Figure 4:
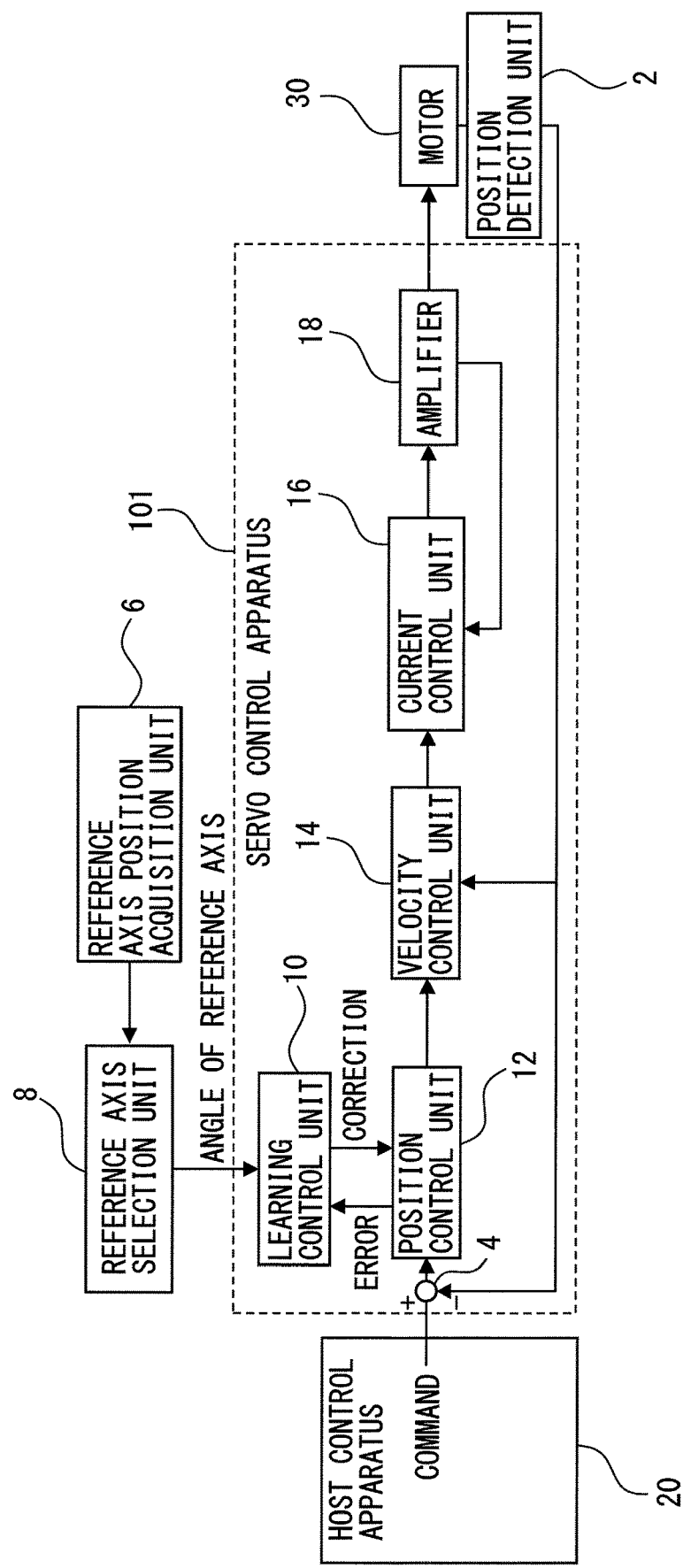
FIG. 4 is a block diagram showing the configuration of a servo control apparatus according to a first embodiment of the present invention.

A description will be given of a servo control apparatus according to a first embodiment of the present invention. FIG. 4 shows a block diagram representing the configuration of the servo control apparatus according to the first embodiment of the present invention. The servo control apparatus 101 according to the first embodiment of the present invention is a servo control apparatus for a machine that performs machining by driving and controlling a servo motor 30 based on a position command and by causing a plurality of synchronizing axes to operate cooperatively in synchronized relationship with a reference axis, and includes a position detection unit 2 for detecting at least one of the position of the servo motor 30 and the position of a driven body (not shown), a position error calculation unit 4 for calculating an error between the position command and the position detected by the position detection unit 2, a reference axis position acquisition unit 6 for acquiring the positions of a plurality of reference axes, a reference axis selection unit 8 for selecting one reference axis on the basis of a machining condition of the driven body from among the plurality of reference axes whose positions have been acquired, and a learning control unit 10 for performing learning control using an angle synchronization method, on the basis of the error and the position of the selected reference axis.

Next, the operation of the servo control apparatus according to the first embodiment of the present invention will be described. First, the position command is input to the servo control apparatus 101 from a host control apparatus 20 such as a numerical control apparatus. The position detection unit 2 is located near the servo motor 30, and detects the position of the servo motor 30. The position of the driven body being driven by the servo motor 30 can be determined based on the position of the servo motor 30.

The position command supplied from the host control apparatus 20 and the detected position fed back from the position detection unit 2 are input to the position error calculation unit 4 which calculates the position error by subtracting the detected position from the position command.

The position error thus calculated is supplied to a position control unit 12 and thence to the learning control unit 10. In the learning control unit 10, learning control is performed, as will be described later, based on the reference axis selected by the reference axis selection unit 8 based on the positions of the reference axes acquired by the reference axis position acquisition unit 6. The servo control apparatus of the present invention employs the angle synchronization method, and acquires angle (position) information from the reference axis. The acquisition of the position is accomplished by the reference axis sending the "position command value" or "position feedback value" of the reference axis to the synchronizing axis. This is executed when the learning control is initiated. More particularly, when the reference axis and the synchronizing axis are under the control of the same DSP (Digital Signal Processor, the CPU for controlling the servo axis), the position can be directly acquired. More than one axis can be assigned to one DSP, but if the respective axes are assigned to different DSPs, the position is acquired in most cases by transmitting and receiving data through communications between the DSPs. Alternatively, it is also possible to transfer position data via the host control apparatus 20 shown in FIG. 4.

The learning control unit 10 calculates the amount of correction through learning control, and supplies the amount of correction thus calculated to the position control unit 12. Based on the amount of correction calculated by the learning control unit 10, the position control unit 12 corrects the position error, and computes a velocity command by multiplying the corrected position error by a position gain.

A velocity control unit 14 computes a current command based on a velocity error which represents the difference between the obtained velocity command and the velocity fed back from a velocity detector (not shown) provided to detect the velocity of the servo motor 30 or the velocity of the driven body.

A current control unit 16 calculates a drive voltage based on the obtained current command and the current value fed back from a current detector (not shown) provided in an amplifier 18. The amplifier 18 drives the servo motor 30 in accordance with the calculated drive voltage.

Figure 5:
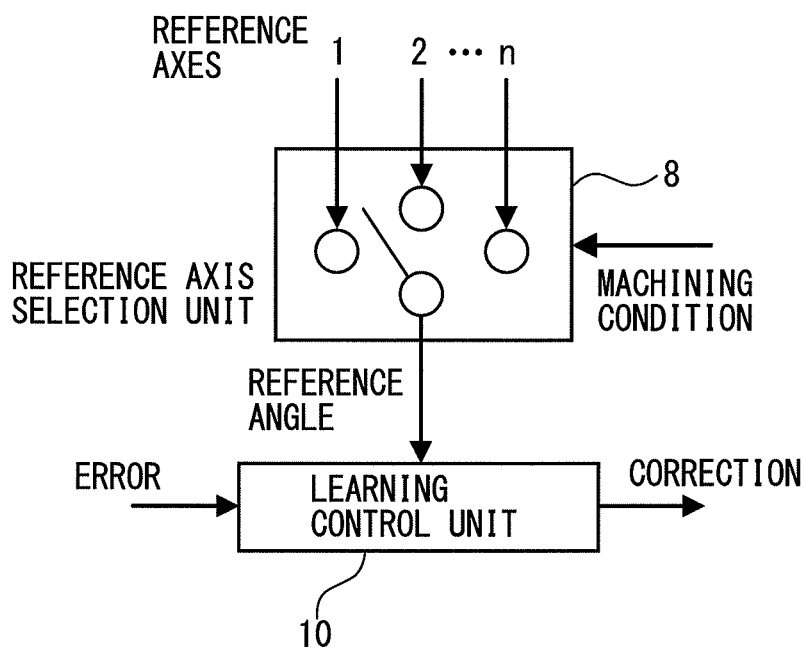
FIG. 5 is a block diagram showing the configuration of a reference axis selection unit in the servo control apparatus according to the first embodiment of the present invention.

FIG. 5 shows the configuration of the reference axis selection unit 8 in the servo control apparatus according to the first embodiment of the present invention. As shown in FIG. 5, the reference axis selection unit 8 selects from among the plurality of reference axes (reference axis 1, reference axis 2, . . . , reference axis n) one reference axis based on the machining condition. The servo control apparatus 101 acquires the machining condition either directly by means of a signal or the like or from the host control apparatus 20, and uses it to determine whether the reference axis is to be changed or not. More specifically, since the machining condition illustrated in the present invention corresponds to the condition that requires changing the work axis, a workpiece changing signal is used to acquire the machining condition. As a result, the machining condition can be acquired either by the servo control apparatus 101 acquiring the workpiece changing signal or by the host control apparatus 20 shown in FIG. 4 acquiring the workpiece changing signal.

Figure 6:
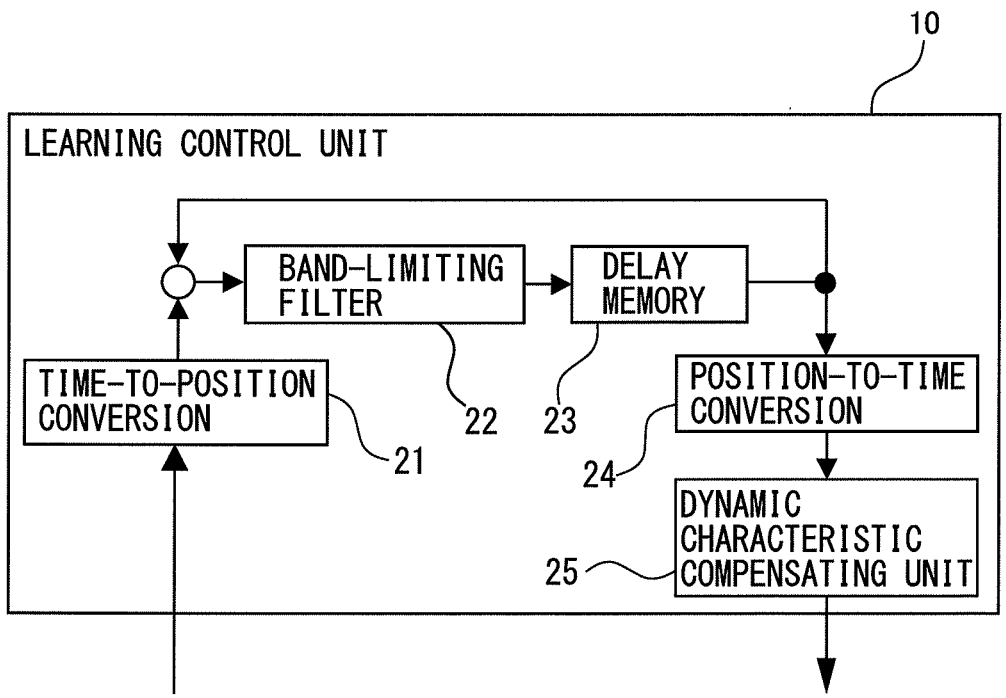
FIG. 6 is a block diagram showing the configuration of a learning control unit that uses an angle synchronization method in the servo control apparatus according to the first embodiment of the present invention.

FIG. 6 shows the configuration of the learning control unit 10 that uses the angle synchronization method in the servo control apparatus according to the first embodiment of the present invention. First, the learning control unit 10 samples a position error at a predetermined sampling frequency. Next, the position error is converted from time to angle by a time-to-position conversion unit 21, filtering or like processing is applied by a band-limiting filter 22, and the result is stored in a delay memory 23. The correction value stored in the delay memory 23 is converted from angle back to time by a position-to-time conversion unit 24, and the result is output via a dynamic characteristic compensating unit 25. The band-limiting filter 22 and the delay memory 23 operate in the angle domain, while the other blocks operate in the time domain.

Figure 7:
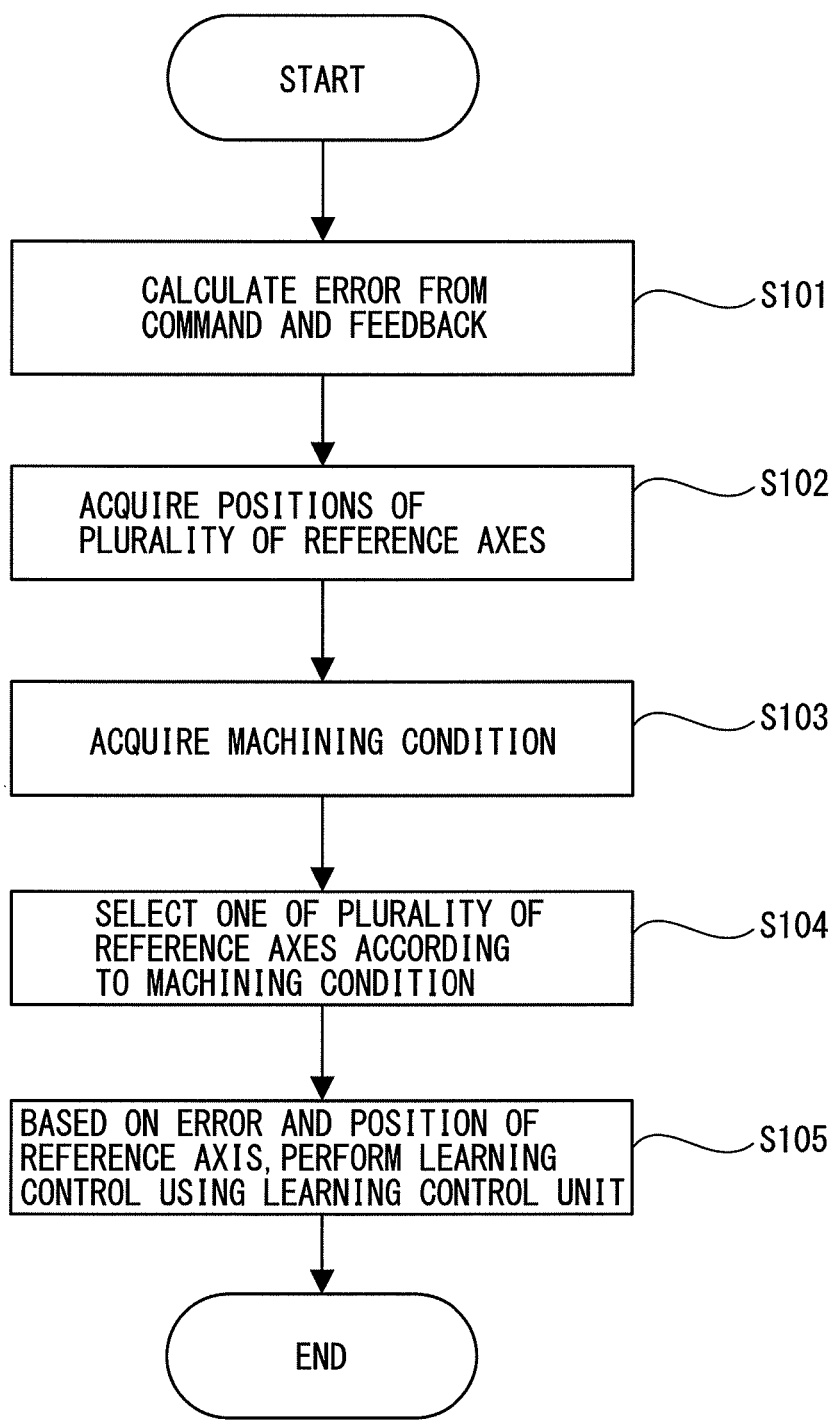
FIG. 7 is a flowchart for explaining the sequence of operations performed by the servo control apparatus according to the first embodiment of the present invention.

Next, the sequence of operations performed by the servo control apparatus according to the first embodiment of the present invention will be described with reference to the flowchart illustrated in FIG. 7. First, in step S101, an error is calculated from the command and the feedback. More specifically, the position error calculation unit 4 (see FIG. 4) calculates the position error from the position command supplied from the host control apparatus 20 and the position data fed back from the position detection unit 2.

Then, in step S102, the positions of the plurality of reference axes are acquired. In step S103, the machining condition is acquired either from the machine or from the host control apparatus. More specifically, the servo control apparatus 101 may acquire the machining condition directly from the machine or may acquire the machining condition from the host control apparatus 20.

Next, in step S104, one of the plurality of reference axes is selected according to the machining condition. More specifically, from among the plurality of reference axes whose positions have been acquired, the reference axis selection unit 8 selects one reference axis based on the machining condition of the driven body.

Next, in step S105, based on the error and the position of the reference axis, learning control is performed using the learning control unit. More specifically, the learning control unit 10 performs learning control using the angle synchronization method, based on the error and the position of the selected reference axis.

As has been described above, according to the servo control apparatus of the first embodiment of the present invention, an appropriate reference axis can be selected according to the machining condition, making it possible to perform effective learning control that matches the machining process. As a result, highly precise machining can be achieved.

Second Embodiment

Figure 8:
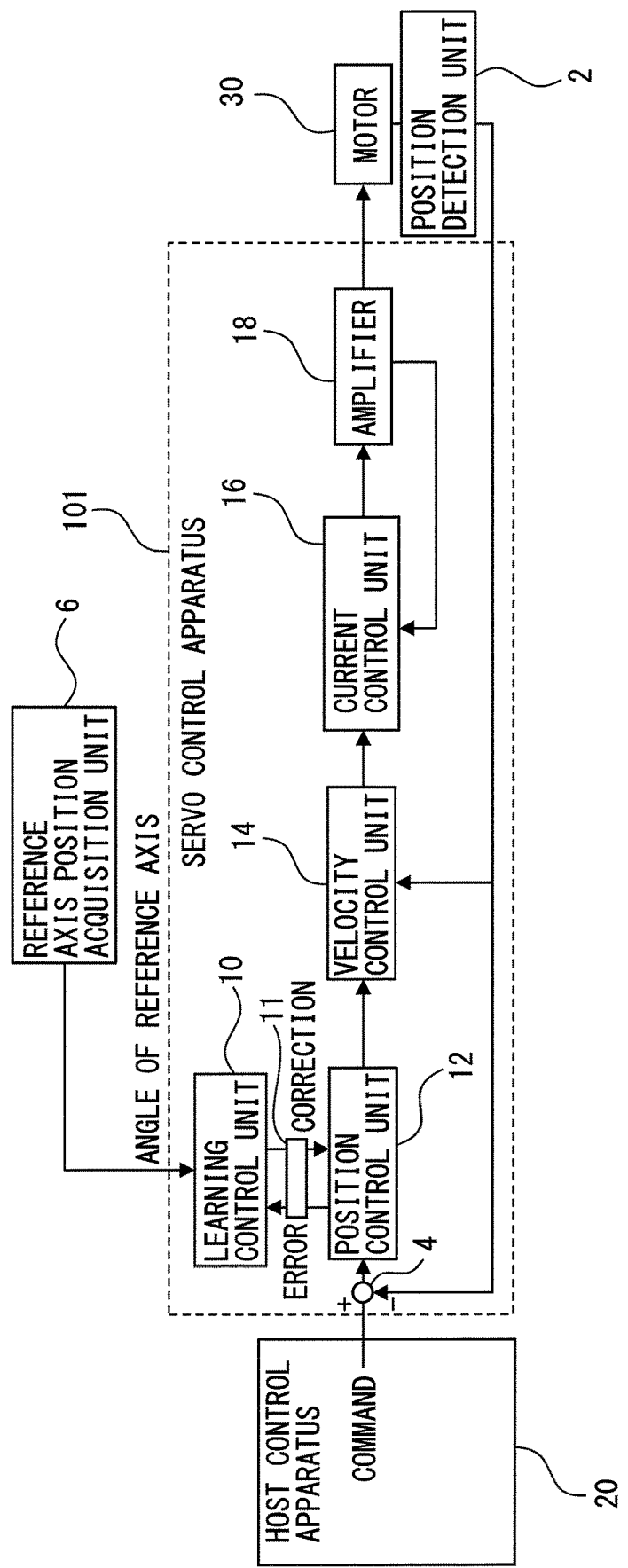
FIG. 8 is a block diagram showing the configuration of a servo control apparatus according to a second embodiment of the present invention.

Next, a description will be given of a servo control apparatus according to a second embodiment of the present invention. FIG. 8 shows a block diagram representing the configuration of the servo control apparatus according to the second embodiment of the present invention. The servo control apparatus 102 according to the second embodiment of the present invention differs from the servo control apparatus 101 according to the first embodiment in that the learning control unit 10 includes a plurality of learning controllers (10-1, 10-2, ..., 10-n (see FIG. 9)) corresponding to the plurality of reference axes and in that the servo control apparatus 102 further includes a learning controller selection unit 11 which selects one of the plurality of learning controllers based on the machining condition, and the selected learning controller performs learning control using the angle synchronization method, based on the error and the position of the selected reference axis. Otherwise, the configuration of the servo control apparatus 102 of the second embodiment is identical to the configuration of the servo control apparatus 101 of the first embodiment, and therefore, will not be described in detail herein.

Figure 9:
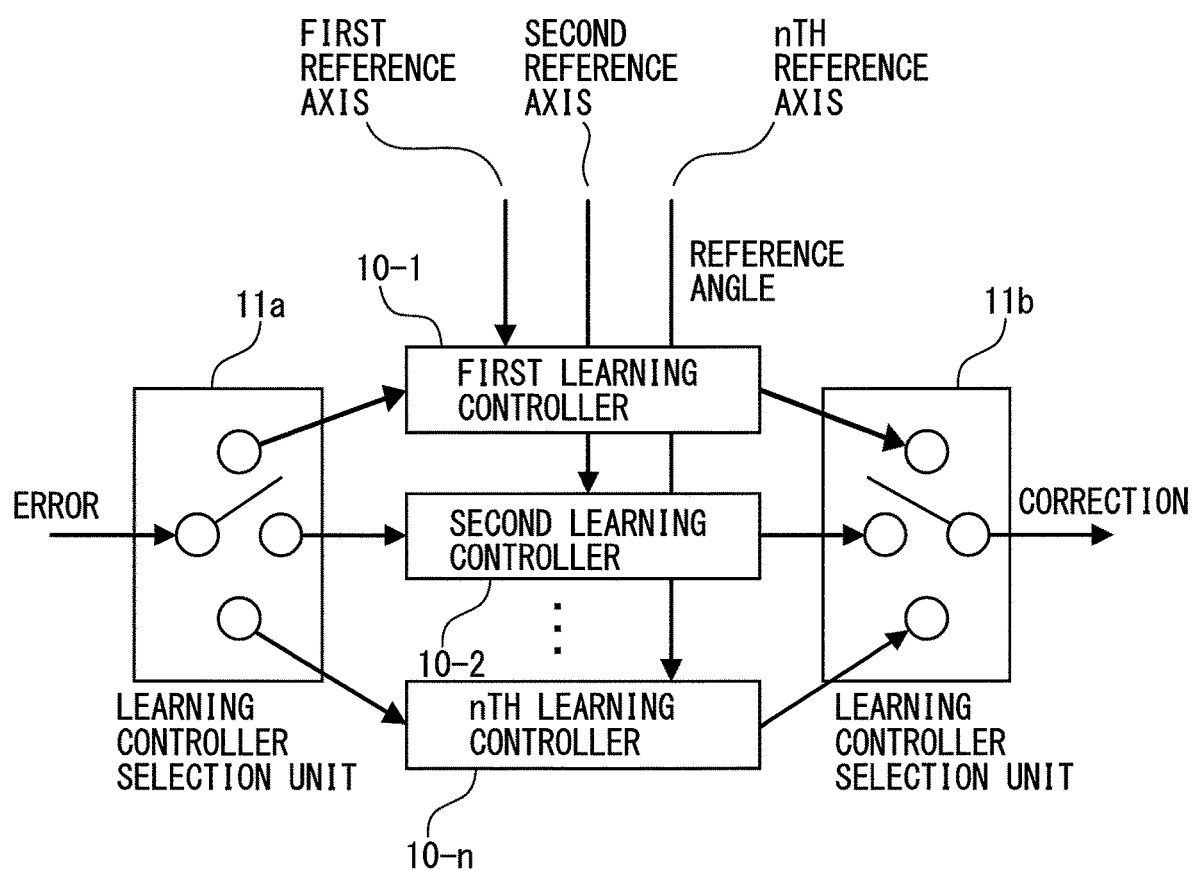
FIG. 9 is a block diagram showing the configuration of a learning controller selection unit in the servo control apparatus according to the second embodiment of the present invention.

FIG. 9 shows the configuration of the learning controller selection unit 11 in the servo control apparatus according to the second embodiment of the present invention. The servo control apparatus 102 according to the second embodiment includes a plurality of (for example, n) learning controllers (first learning controller 10-1, second learning controller 10-2, ..., nth learning controller 10-n), and is characterized in that when the reference axis is changed by selecting one of the plurality of reference axes (first reference axis, second reference axis, ..., nth reference axis), the learning controller is also changed in synchronized fashion. In the example shown in FIG. 9, the learning controller selection unit 11 is divided between a learning controller selection unit 11a at the error input side and a learning controller selection unit 11b at the correction output side. When the first reference axis is selected, the switch in the learning controller selection unit 11a at the error input side and the switch in the learning controller selection unit 11b at the correction output side are respectively thrown so as to select the first learning controller 10-1. Likewise, when the nth reference axis is selected, the switch in the learning controller selection unit 11a at the error input side and the switch in the learning controller selection unit 11b at the correction output side are respectively thrown so as to select the nth learning controller 10-n.

Figure 10:
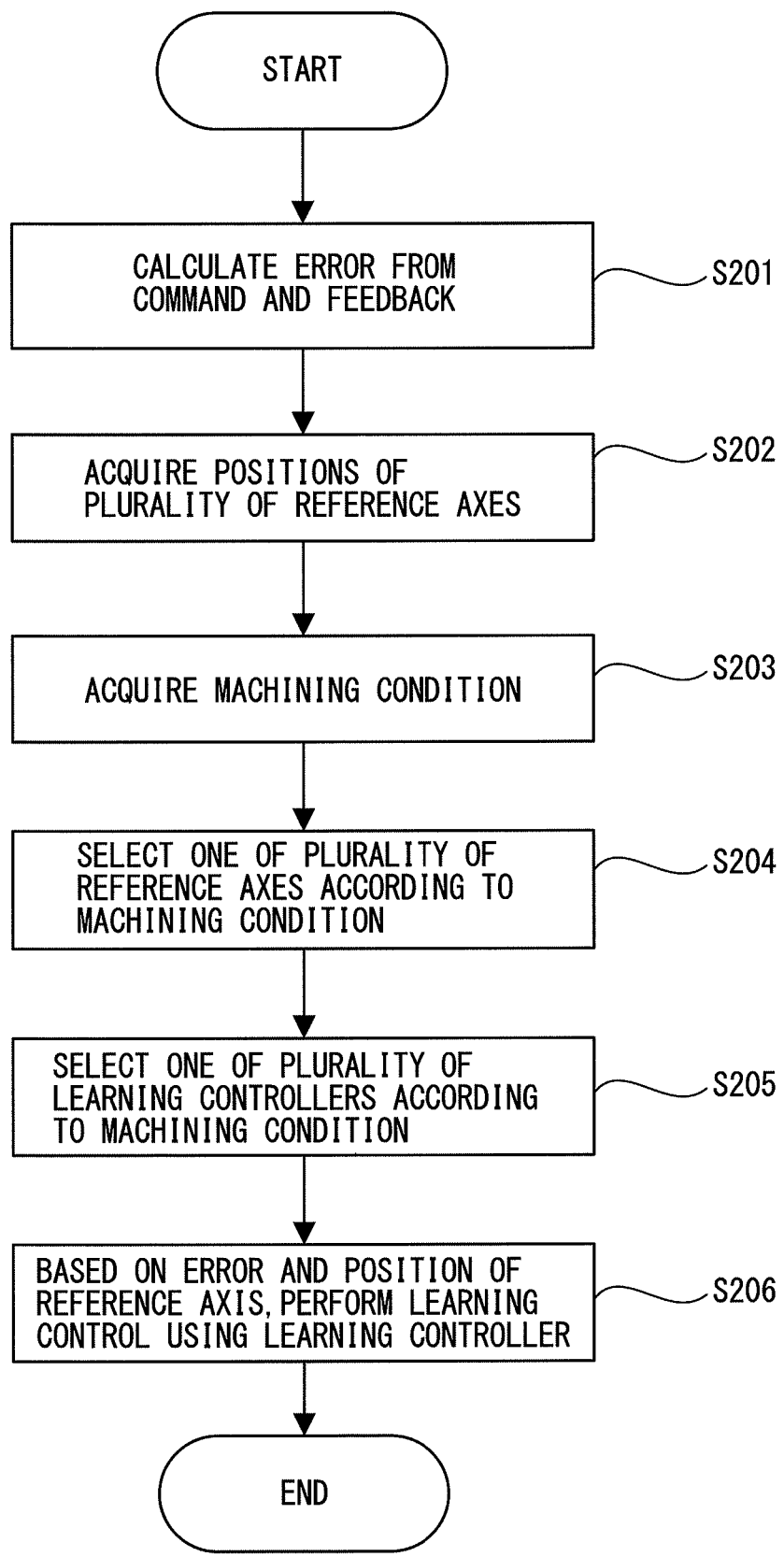
FIG. 10 is a flowchart for explaining the sequence of operations performed by the servo control apparatus according to the second embodiment of the present invention.

Next, the sequence of operations performed by the servo control apparatus according to the second embodiment of the present invention will be described with reference to the flowchart of FIG. 10. First, in step S201, an error is calculated from the command and the feedback. More specifically, the position error calculation unit 4 (see FIG. 8) calculates the position error from the position command supplied from the host control apparatus 20 and the position data fed back from the position detection unit.

Then, in step S202, the positions of the plurality of reference axes are acquired. In step S203, the machining condition is acquired either from the machine or from the host control apparatus. More specifically, the servo control apparatus 102 may acquire the machining condition directly from the machine or may acquire the machining condition from the host control apparatus 20.

Next, in step S204, one of the plurality of reference axes is selected according to the machining condition. More specifically, from among the plurality of reference axes whose positions have been acquired, the reference axis selection unit 8 selects one reference axis based on the machining condition of the driven body.

Further, in step S205, one of the plurality of learning controllers is selected according to the machining condition. More specifically, from among the plurality of learning controllers (first learning controller 10-1, second learning controller 10-2, . . . , nth learning controller 10-n), the learning controller selection unit 11 selects one learning controller based on the machining condition of the workpiece.

Next, in step S206, based on the error and the position of the reference axis, learning control is performed using the learning control unit. More specifically, the learning control unit performs learning control using the angle synchronization method, based on the error and the position of the selected reference axis. The machining condition is acquired either directly by means of a signal or the like or from the host control apparatus 20, and is used to determine whether the reference axis is to be changed or not.

As has been described above, according to the servo control apparatus of the second embodiment of the present invention, since the learning controller is changed synchronously with the changing of the reference axis, it becomes possible to hold the amount of correction generated for each machining process. This serves to reduce the time taken between the initiation of learning and the generation of correction data, serving to improve the productivity.

According to the servo control apparatus of the embodiment of the present invention, an appropriate reference axis can be selected according to the machining condition, making it possible to perform effective learning control that matches the machining process. As a result, highly precise machining can be achieved.

The invention claimed is:

1. A servo control apparatus for a machine that performs machining by driving and controlling a servomotor on the basis of a position command and by causing a plurality of synchronizing axes to operate cooperatively in synchronized relationship with a plurality of reference axes, the servo control apparatus comprising:
a processor to perform the following steps:
  calculating a position error between the position command and a detected position of the servomotor;
  acquiring positions of a plurality of reference axes;
  selecting one reference axis on the basis of a machining condition of a driven body from among the plurality of reference axes whose positions have been acquired, a machine condition is acquired by using a workpiece changing signal; and
a plurality of learning control processors for performing learning control using an angle synchronization method, on the basis of the position error and the position of the selected reference axis,
  wherein the plurality of learning control processors performs the following steps:
    sampling the position error at a predetermined sampling frequency;
    converting the position error from time reference to position reference;
    filtering the converted position error;
    storing the filtered position error in a delay memory;
    converting the position error stored in the delay memory from position reference to time reference; and
    outputting the position error as correction value,
  wherein the plurality of learning control processors is changed in synchronized fashion when the reference axis is changed by selecting a different one of the plurality of reference axes from the reference axis previously selected, and
  wherein the plurality of learning control processors correspond to the plurality of reference axes.

2. The servo control apparatus according to claim 1, wherein the machining condition is acquired either from the machine or from a host control apparatus.

\* \* \* \* \*